United States Patent
Dufour et al.

(10) Patent No.: US 6,183,012 B1
(45) Date of Patent: Feb. 6, 2001

(54) ENERGY ABSORBING DEVICE WITH DOUBLE SPRING MEANS FOR STEERING COLUMNS

(75) Inventors: Christophe Dufour, Lance; Pascal Millet, Vendome; Vincent Fargeas, Moree, all of (FR)

(73) Assignee: Lemförder Nacam SA, Vendome (FR)

( * ) Notice: Under 35 U.S.C. 154(b), the term of this patent shall be extended for 0 days.

(21) Appl. No.: 09/257,009

(22) Filed: Feb. 25, 1999

(30) Foreign Application Priority Data

Mar. 3, 1998 (FR) .................................................. 98-02668

(51) Int. Cl.⁷ ........................................................ B62D 1/11
(52) U.S. Cl. ............................ 280/777; 188/374; 188/371
(58) Field of Search ............................. 280/777; 188/371, 188/372, 373, 374

(56) References Cited

U.S. PATENT DOCUMENTS

| | | | |
|---|---|---|---|
| 3,126,072 | * 3/1964 | Johansson | 188/371 |
| 4,531,619 | * 7/1985 | Eckels | 188/371 |
| 5,961,146 | * 10/1999 | Matsumoto et al. | 280/777 |
| 6,019,391 | * 2/2000 | Stuedemann et al. | 280/779 |

FOREIGN PATENT DOCUMENTS 195 10 615 A1  9/1996 (DE).

\* cited by examiner

*Primary Examiner*—Paul N. Dickson
*Assistant Examiner*—Faye M. Fleming
(74) *Attorney, Agent, or Firm*—Laubscher & Laubscher

(57) ABSTRACT

A motor vehicle steering column comprises a steering shaft mounted in a body-tube connected via a support assembly to the chassis of the vehicle, the support assembly comprising a mobile support, a fixed support attached to the chassis of the vehicle and a double winding mounted on a member rotating on a fixed shaft. The double winding has a central portion mounted on the mobile support connected to the body tube so that in the event of an impact the mobile support pushes the double winding and unwinds it to absorb energy.

6 Claims, 4 Drawing Sheets

ENERGY ABSORBING DEVICE WITH DOUBLE SPRING MEANS FOR STEERING COLUMNS

BACKGROUND OF THE INVENTION

1. Field of the Invention

The present invention concerns an energy absorbing device with a double winding for motor vehicle steering columns.

The device in accordance with the invention applies in particular to a steering column which can be adjusted in depth or in inclination or a steering column which can be adjusted in depth and in inclination, comprising a steering shaft mounted in a body-tube which is supported and immobilized in the required position, the body-tube being connected by a support assembly to the chassis or to a part of the body of the vehicle.

2. Description of the Prior Art

Ongoing safety improvements concerning steering columns oblige manufacturers to control all parameters of energy absorbing systems. The method of absorbing energy by unwinding a metal wire is increasingly used for steering columns and it is now necessary but difficult to vary the energy absorbing travel in accordance with a defined impact force.

The resulting compromise often leads steering column manufacturers to manufacture wires of complex shape or of varying section. The major disadvantage lies in the use of the product, which leads the manufacturer to costly technology solutions.

OBJECT OF THE INVENTION

The main object of this invention is to propose an energy absorbing device which uses a wire that is of simple shape and easy to make, which absorbs exactly a predetermined quantity of energy to be dissipated and which is easy to fit within the overall size of existing steering columns.

SUMMARY OF THE INVENTION

According to the invention, the energy absorbing device for a motor vehicle steering column comprising a steering shaft rotatably mounted in a body-tube connected by a support assembly to the chassis of the vehicle and is intended to operate in a direction substantially parallel to the axis of the steering column, the support assembly comprising a mobile support mounted on the body-tube, a fixed support fastened to the chassis of the vehicle, the mobile support being immobilized on the fixed support with a particular force, and a double winding of a metal member of particular section comprising two coaxial windings joined by a central portion, the double winding being mounted on a member rotating on a fixed shaft attached to the fixed support and the central portion of the double winding being mounted on the mobile support so that in the event of an impact the mobile support pushes on the central portion of the double winding to unwind the double winding and absorb the energy to be dissipated.

In a particularly simple embodiment of the invention, the double winding comprises two helical windings in opposite directions with the same number of turns in each winding. The winding are joined by a central loop that cooperates with the mobile support so that in the event of an impact the two windings are unwound simultaneously to absorb energy.

In a more developed embodiment of the invention, the double winding comprises two helical windings in opposite directions with different numbers of turns in each winding. The windings are joined by a central loop which cooperates with the mobile support member so that in the event of an impact initially both windings are unwound simultaneously and subsequently a single winding is unwound, which varies the absorption of energy over time.

In order to adapt at best the device of the invention, the metal member of the double winding has a round section, and in other embodiments, this section is square or rectangular or other.

A particularly interesting implementation of the energy absorbing device according to the invention has the following structure:

the fixed support comprises two substantially parallel lugs between which the mobile support is engaged, each of the lugs having a hole through which passes the fixed shaft of the rotary member of the energy absorbing device, the mobile support has two side portions and a connecting portion, each of the side portions having a hole in its lower part through which passes the shaft of a system for adjusting the inclination and/or the depth of the steering column, each of the side portions has an oblong hole in its upper part through which passes the fixed shaft of the rotary member of the energy absorbing device, the length of which corresponds to the energy recovery travel, the turning member is on the fixed shaft of the energy absorbing device which is immobilized on each of the lugs of the fixed support member with a particular clamping force, the central portion of the double winding is hooked over a lug in the connecting portion of the mobile support member, passing over the lug and engaging in notches on each side of the lug, so that in the event of an impact the steering wheel with the body-tube and the mobile support move towards the front of the vehicle, entraining the double winding, which unwinds around the fixed shaft attached to the fixed support.

The energy absorbing device in accordance with the invention therefore has the advantage of a structure that is very simple to manufacture, with guaranteed quality of manufacture in a mass production situation, as is the case in the automotive industry. What is more, the device fits easily within the overall size of existing steering columns. The double winding system increases the force absorbed whilst retaining the same unwinding travel. It also has the advantage of a small number of parts and of very easy fixing to its support, without requiring any additional parts or welds to hold it in place.

BRIEF DESCRIPTION OF THE DRAWINGS

The foregoing and other objects, features and advantages of the invention will be apparent from the following detailed description of several embodiments of the invention with reference to the corresponding accompanying drawings, in which.

DESCRIPTION OF THE PREFERRED EMBODIMENTS

Figure 1:
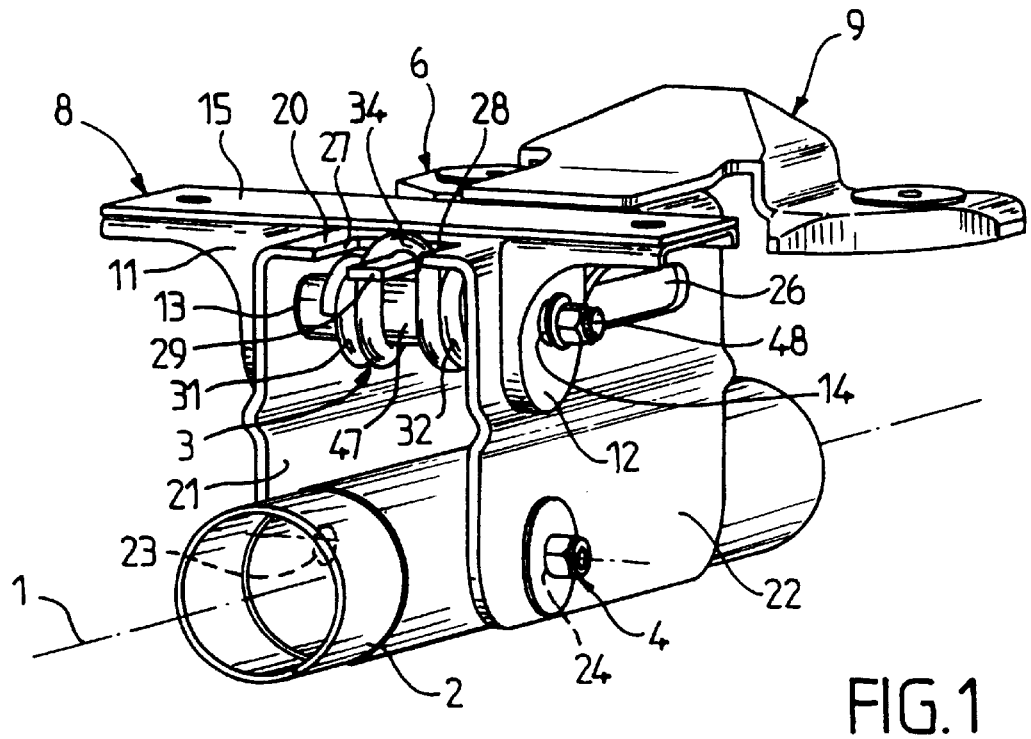
FIG. 1 is a perspective view of the entire energy absorbing device in accordance with the invention, with a round section double winding with the same number of turns in both windings, the steering column being in its normal position prior to an impact.

A motor vehicle steering column comprises a steering shaft 1 which is mounted to rotate in a body-tube 2, as shown in FIGS. 1 to 5. The body-tube 2 is connected to a support assembly 6 via a depth and/or inclination adjustment system 4. The invention applies equally to a non-adjustable steering column whose body-tube 2 is generally U-shaped inverted fixed directly to the support assembly 6.

The support assembly 6 comprises a fixed support 8 and a generally U-shaped inverted mobile support 9. The fixed support 8 is attached to the chassis 10 of the vehicle (FIG. 4) or to a part of the body. The mobile support 9 is joined to the body-tube 2 by the position adjustment system 4. The mobile support 9 is joined to the fixed support member 8 and is immobilized thereon with a predetermined force which allows for the impact to be absorbed to allow the mobile support 9 to slide in the fixed support 8.

The fixed support 8 includes a base 15 with two substantially parallel vertical lugs 11 and 12 mounted on the base 15. Each of the lugs 11 and 12 has a respective hole 13 and 14 through which passes the shaft of the mobile support 9.

The mobile support 9 has two substantially parallel vertical side portions 21 and 22 and a substantially horizontal connecting portion 20. The two side portions 21 and 22 of the mobile support 9 engage between the two lugs 11 and 12 on the fixed support 8.

Each of the side portions 21 and 22 has a respective oblong hole 25 and 26 in its upper part through which the shaft of the mobile support 9 passes.

The length of each of the oblong holes 25 and 26 corresponds to the energy recovery travel.

Each of the lateral portions 21 and 22 has a respective hole 23 and 24 in its lower part through which the shaft of the adjustment system 4 passes.

The energy absorption device is disposed so that it operates in a direction substantially parallel to the axis of the steering column.

As shown in FIGS. 1 to 7 the steering column energy absorbing device in accordance with the invention comprises a double winding 3 of a metal member which has a constant section chosen in accordance with the required energy dissipation. The double winding 3 comprises two torsion springs windings which are coaxial and which are joined by a central portion. The double spring winding 3 is mounted on a rotary sleeve member 47 turning on a fixed shaft 48 attached to the fixed support 8. Its central portion is mounted on the mobile support 9 connected to the body-tube 2 so that in the event of an impact said mobile support 9 connected to the body-tube 2, and therefore to the steering wheel, pushes on the central portion of said double winding 3 to unwind said double winding 3 and absorb the energy to be dissipated.

Figure 2:
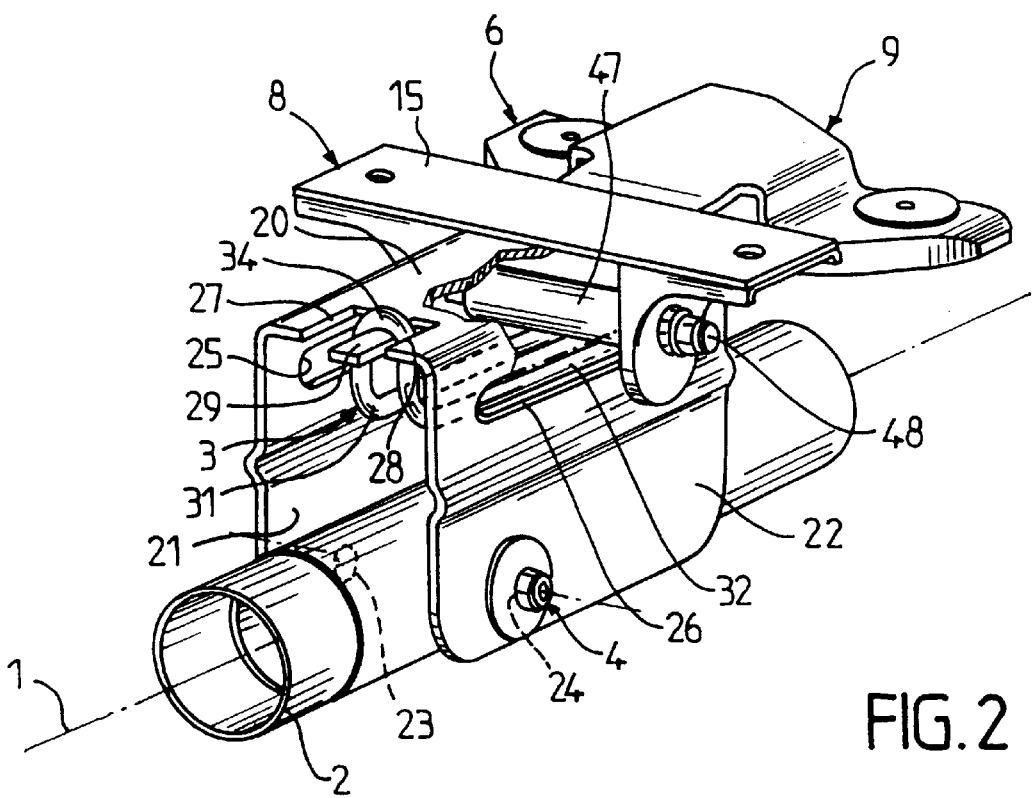
FIG. 2 is a view analogous to FIG. 1, partly cut away, showing the steering column in a position after an impact.

In the embodiment shown in FIGS. 1 and 2 the double winding 3 comprises two round section helical windings 31 and 32 in opposite directions and with the same number of turns in each winding, joined by a central loop 34. The central loop 34 cooperates with the support 9 connected to the body-tube 2. The mobile support 9 pushes on said central loop 34 in the event of an impact so that the two windings 31 and 32 are unwound simultaneously to dissipate the required quantity of energy.

The rotary sleeve member 47 is on the fixed shaft 48 which is mounted in the two holes 13 and 14 through the lugs 11 and 12 on the fixed support 8. The fixed shaft 48 passes through the two oblong holes 25 and 26 in the mobile support 9 and is immobilized with a particular clamping force on the two lugs 11 and 12 on the fixed support 8.

The fixed shaft 48 of the rotary member 47 therefore constitutes the shaft by which the mobile support 9 is retained in the fixed support 8.

The length of each of the oblong holes 25 and 26 corresponds to the energy recovery travel.

Figure 3:
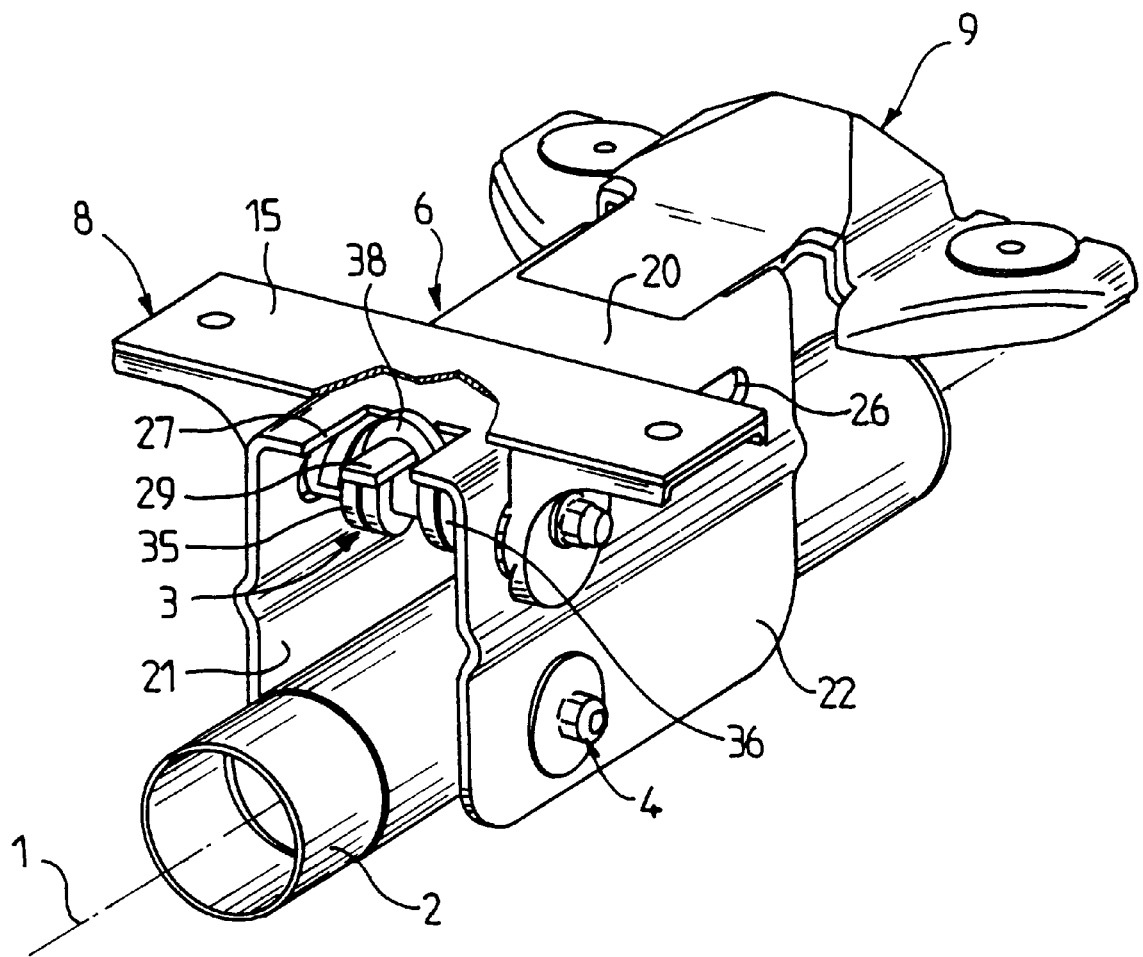
FIG. 3 is a view analogous to FIG. 1, partly cut away, showing a square section double winding with the same number of turns in each winding.
Figure 4:
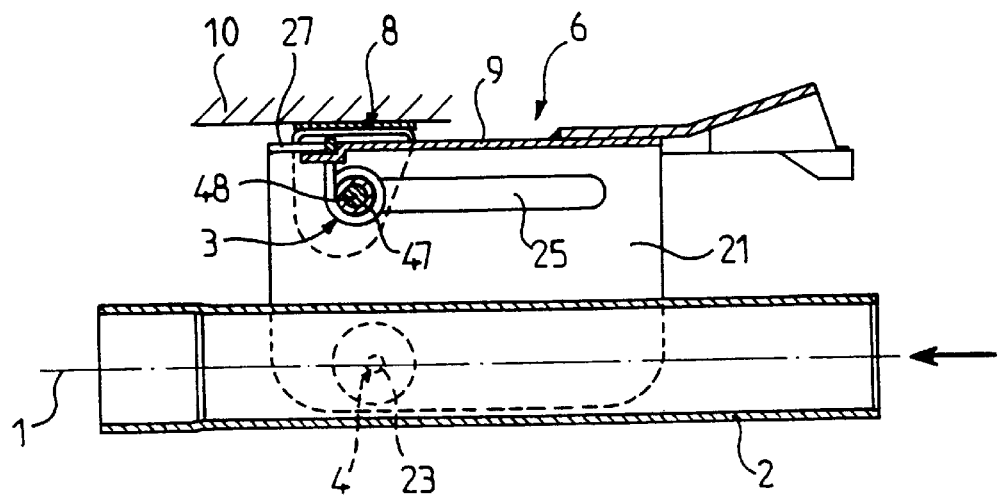
FIG. 4 is a view in axial section in the vertical plane, showing the steering column in a normal position before an impact.

In FIGS. 1, 3 and 4, which show the normal position before an impact, the fixed shaft 48 passes through the front ends of the oblong holes 25 and 26.

Figure 5:
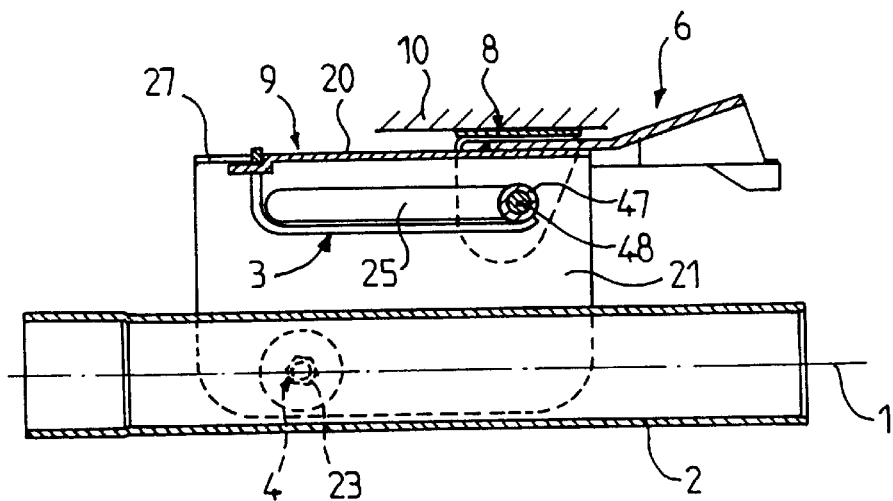
FIG. 5 is a view analogous to FIG. 4, showing the steering column in a position after an impact.

In FIGS. 2 and 5, which show a position after an impact, the oblong holes 25 and 26 in the mobile support 9 have moved forward.

In the embodiment shown in FIGS. 1, 2, 4 and 5 the double winding 3 is mounted on the rotary member 47 and its central loop 34 is hooked onto a lug 29 in the connection portion 20 of the mobile support 9, fitting over said lug 29 and engaging in notches 27, 28 formed on respective opposite sides of said lug 29, so that in the event of an impact the steering wheel together with the body-tube 2 and the mobile support 9 move towards the front of the vehicle, entraining the double winding 3, which unwinds around the rotary member 47 on the fixed shaft 48 attached to the fixed support 8.

In the embodiment shown in FIG. 3 the double winding 3 comprises two square section helical windings 35 and 36 in opposite directions with the same number of turns in each winding, the two windings 35 and 36 being joined by a central loop 38. The central loop 38 cooperates with the mobile support 9 connected to the body-tube 2 and which pushes on said central loop 38 in the event of an impact so that the two windings 35 and 36 are simultaneously unwound to dissipate the required energy.

The rotary member 47 is mounted in exactly the same way as described previously in connection with FIGS. 1, 2, 4 and 5. The double winding 3 is mounted on the rotary member 47 and its central loop 38 is hooked over a lug 29 in the connecting portion 20 of the mobile support 9, fitting over said lug 29 and engaging in notches 27, 28 on respective opposite sides of said lug 29. In the event of an impact the steering wheel together with the body-tube 2 and the mobile support 9 move towards the front of the vehicle, entraining the double winding 3, which unwinds around the rotary member 47 of the fixed shaft 48 attached to the fixed support 8.

Figure 6:
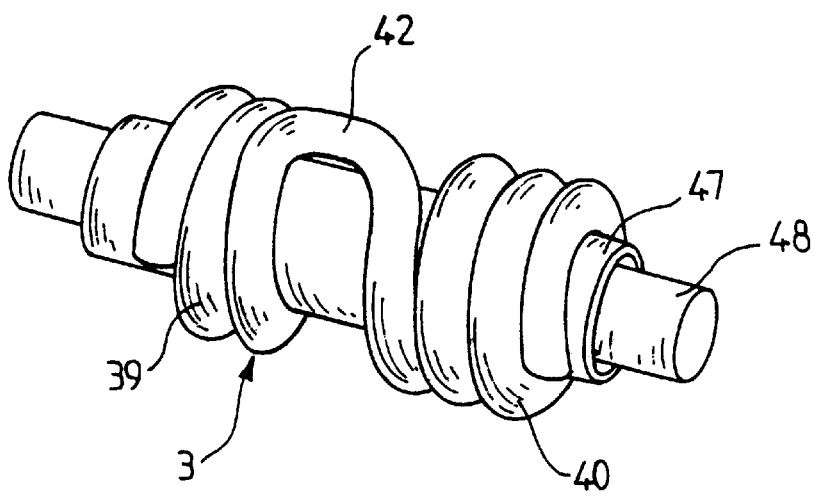
FIG. 6 is a perspective view of a round section double winding with different numbers of turns in each winding, before an impact.
Figure 7:
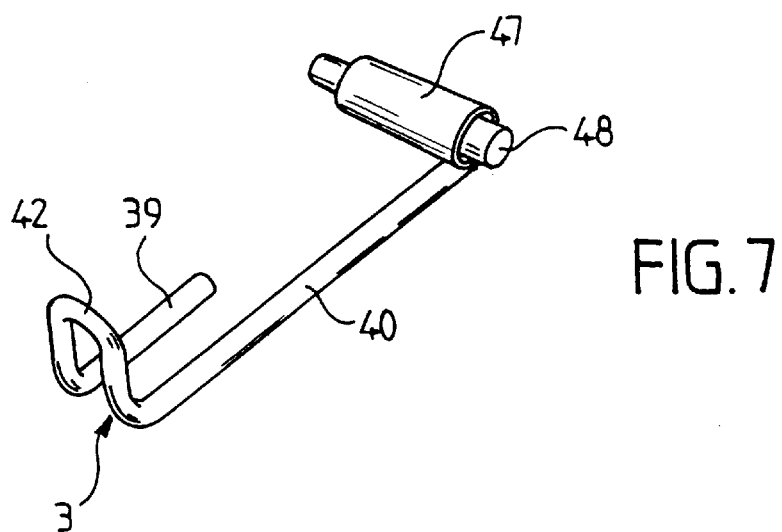
FIG. 7 is a view analogous to FIG. 6, after an impact.

In the embodiment shown in FIGS. 6 and 7 the double winding 3 comprises two round section helical windings 39 and 40 in opposite directions and having different numbers of turns in each winding and joined by a central loop 42. The central loop 42 cooperates with the mobile support 9 connected to the body-tube 2 and which pushes on said central loop 42 in the event of an impact so that initially the two windings 39 and 40 are unwound simultaneously and subsequently only one winding 40 is unwound, which varies the energy dissipated over time. The mounting of the various components is identical to that described previously in connection with FIGS. 1, 2, 4 and 5.

Figure 8:
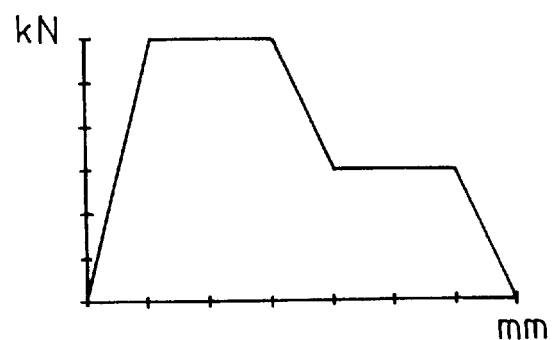
FIG. 8 is a graph showing the force absorbed during the absorption travel in the embodiment shown in FIGS. 6 and 7.

This variation in the energy dissipated is shown in FIG. 8, which represents the variation in the force absorbed as a function of the travel of the mobile support 9.

In this last embodiment with different numbers of turns in the windings 39 and 40, the mounting arrangements are similar to those shown in FIGS. 1 to 3.

In embodiments with windings having different numbers of turns, the section can also be square. This type of section is shown in FIG. 3. The section of the double winding can instead be rectangular or otherwise.

What we claim is:

1. An energy absorbing device for connecting the steering column of a motor vehicle with the vehicle chassis, comprising:
   (a) fixed support means (8) adapted for connection with the vehicle chassis;
   (b) steering column means including a support tube (2) and a steering shaft (1) rotatably mounted concentrically within said support tube;
   (c) movable support means (9) connected with said support tube;
   (d) first connecting means connecting said movable support means for displacement in a given direction generally parallel with said support tube between first and second positions, said connecting means including a fixed shaft (48) connected with said fixed support means and extending in a plane normal to said given direction; and
   (e) spring means normally biasing said movable support means toward said first position, said spring means including:
      (1) a support sleeve (47), rotatably mounted concentrically about said fixed shaft;
      (2) a pair of metal helical torsion spring portions (31, 32) mounted in axially spaced relation concentrically about said support sleeve, said torsion spring portions having coil turns that extend in opposite directions, respectively;
      (3) a central metal portion (42) integral with and projecting tangentially from the adjacent ends of said torsion spring portions, respectively; and
      (4) second connecting means (29) connecting said central spring portion with said movable support means, said second connecting means being operable upon the application of an impact force to the vehicle chassis to progressively displace said central spring portion away from said support sleeve and thereby unwind the adjacent turns of said torsion spring portions, respectively, whereby the energy of the impact force is absorbed by said spring means.

2. An energy absorbing device as defined in claim 1, wherein said helical spring portions have the same number of turns, thereby causing simultaneous unwinding of said spring portions, whereby the impact energy is equally absorbed by said spring portions.

3. An energy absorbing device as defined in claim 1, wherein said helical spring portions have an unequal number of turns, said spring means being operable such that during the initial displacement of said movable member toward said second position, both spring portions are progressively unwound to absorb a relatively high level of impact force, and during the subsequent final displacement of said movable member toward said second position, a lower level of impact force is absorbed by said spring means.

4. An energy absorbing device as defined in claim 1, wherein the turns of each of said helical torsion spring positions has a round cross-sectional configuration.

5. An energy absorbing device as defined in claim 1, wherein the turns of each of said helical torsion spring portions has a square cross-sectional configuration.

6. An energy absorbing device as defined in claim 1, wherein said fixed support means includes:
   (a) a generally U-shaped inverted fixed member having a horizontal base portion (15), and a pair of downwardly extending lug portions (11, 12) that extend downwardly on opposite sides of said steering column support tube;
   (b) said fixed member leg portions containing opposed openings (13, 14) between which said fixed shaft is supported;
   and further wherein said movable support means includes:
   (a) a generally U-shaped inverted movable member (9) arranged, within said fixed member, said movable member having a connecting portion (20) parallel with and adjacent said fixed member base portion, and a pair of downwardly depending side portions (21, 22) adjacent the adjacent surfaces of said fixed member lug portions, respectively;
   (b) said side portions containing a pair of opposed lower openings (23, 24) between which said steering column support tube is connected, and a pair of opposed oblong upper openings (13, 14) receiving said fixed shaft, said oblong openings extending parallel with said given direction of displacement, and the length of said oblong openings corresponding with the length of travel of said movable member between said first and second positions; and
   (c) said movable member connecting portion including lug means (29) for connecting said movable member with said spring means center portion.

* * * * *